US007757030B2

(12) United States Patent
Sherwin, Jr. et al.

(10) Patent No.: US 7,757,030 B2
(45) Date of Patent: Jul. 13, 2010

(54) SIMULATING HARDWARE DYNAMIC PARTITIONING CAPABILITIES

(75) Inventors: Bruce J Sherwin, Jr., Woodinville, WA (US); Santosh S Jodh, Sammamish, WA (US); Timothy Chao, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 23 days.

(21) Appl. No.: 11/305,049

(22) Filed: Dec. 16, 2005

(65) Prior Publication Data

US 2007/0143588 A1 Jun. 21, 2007

(51) Int. Cl.
*H05K 7/10* (2006.01)
(52) U.S. Cl. .................... 710/302; 710/304; 710/104; 713/100; 711/173
(58) Field of Classification Search ......... 710/301–306, 710/104, 100; 711/153, 173, 163; 714/48; 713/100
See application file for complete search history.

(56) References Cited

U.S. PATENT DOCUMENTS

| 7,017,034 | B2* | 3/2006 | Qureshi et al. ................. 713/1 |
| 7,373,497 | B2* | 5/2008 | Circenis et al. ............. 713/100 |
| 7,386,764 | B2* | 6/2008 | LeDuc et al. ................. 714/48 |
| 2002/0010844 | A1* | 1/2002 | Noel et al. .................. 711/153 |
| 2004/0088513 | A1* | 5/2004 | Biessener et al. ........... 711/173 |
| 2005/0071625 | A1* | 3/2005 | Schwartz et al. ............ 713/100 |

* cited by examiner

*Primary Examiner*—Mark Rinehart
*Assistant Examiner*—Kim T Huynh
(74) *Attorney, Agent, or Firm*—Wolf, Greenfield & Sacks, P.C.

(57) ABSTRACT

A system and method for providing DP capabilities on a computer system is provided. The DP capabilities include hot-add and hot-replace of various hardware components such as a processor, memory, and an I/O device to the computer system. The namespace of the hardware components on a computer system is separately created and stored. Some portion of the hardware components is prevented from being recognized during an initial boot. The unrecognized hardware components can be recognized by manipulation of the namespace modules.

20 Claims, 10 Drawing Sheets

SIMULATING HARDWARE DYNAMIC PARTITIONING CAPABILITIES

BACKGROUND

Generally described, some computing device, such as servers, may support hardware dynamic partitioning (DP) capabilities which allow users to hot-add and hot-replace various hardware devices on the computing device. For example, when a server allows a processor hot-add capability, several processors can be added to the server without requiring the server to be shut down. Similarly, when the server allows a memory hot-replace capability, several memories can be replaced with memories used by the server without requiring the server to be shut down. Such hardware DP capabilities are very useful when replacing of defective components or expanding (scaling) server capabilities without requiring shutting down the server is critical.

Hardware DP capabilities have typically required specially designed hardware running with highly specialized basic input/output system (BIOS) code in conjunction with the Advanced Configuration and Power Interface (ACPI) standard. Generally, the ACPI specification defines the ACPI interfaces, including the interface between the operating system software, the hardware, and the BIOS software that can be utilized to support dynamic configuration of hardware (specially designed to be hot-plugged) hot-added and/or hot-replaced during runtime. However, current approach to provide DP capabilities can be prohibitively expensive. Additionally, the specialized BIOS may not be available for some type of computer devices, such as personal computers. Thus, testing of software and hardware designed to utilize dynamic DP capabilities relies use of prohibitively expensive computer systems. Additionally, users are currently limited to the expensive computing systems for scenarios requiring hardware DP capabilities.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A system and method for providing DP capabilities on a computer system is provided. The DP capabilities include hot-add and hot-replace of various hardware components such as a processor, memory, and an I/O device to the computer system. The namespace of the hardware components on a computer system is separately created and stored. Some portion of the hardware components is prevented from being recognized during an initial boot. The unrecognized hardware components can be recognized by manipulation of the namespace modules.

In accordance with an aspect of the invention, a method for managing hardware on a computer system is provided. A computing device obtains a hardware topology of the computer system, translates the topology into namespace information. The computing device stores the namespace information to memory. The computing device then configures boot switch information to cause at least one hardware component to be inactive on next boot. After a reboot, the computing device dynamically loads the namespace information corresponding to the hardware component from the memory. This allows the operating system to recognize the previously inactive hardware component.

When the operating system recognizes the inactive hardware component, the hardware component may be hot-added or hot-replaced to the computer system. If hot-adding the inactive hardware component is desired, the inactive hardware component is added to the computer system thereby making the added hardware component available to the computer system. If hot-replacing another hardware component with the inactive hardware component is desired, the operating system is caused to recognize the inactive hardware component as a spare hardware component and then to swap the spare hardware component with another hardware component. The hardware component to be hot-added and/or hot-replaced includes a processor, memory, an I/O device, and the like.

In accordance with another aspect of the invention, a computer-readable medium having computer-executable components for implementing dynamic partitioning is provided. The computer-executable components include a dynamic partitioning component that obtaining a hardware topology of a computer system. The computer-executable components further include a namespace translator component that translates the obtained hardware topology of the computer system in namespace information and a data storage component that stores the namespace information translated by the namespace translator component. The namespace information includes corresponding namespace information of at least one hardware component which is to be inactive at the reboot time. The dynamic partitioning component further causes an operating system to reboot the computer system with the at least one hardware component inactive. Upon a reboot, the dynamic partitioning component loads the namespace information corresponding to the at least one hardware component.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Generally described, the present invention is related to a system and method for managing hardware components utilizing hardware dynamic partitioning. The present invention is primarily described herein with reference to several exemplary embodiments including ACPI related components. However, there is no intention to limit the present invention to be ACPI specific. Rather, the present invention is intended to operate with and provide benefits with any operating system, architecture, and/or configuration system.

Figure 1:
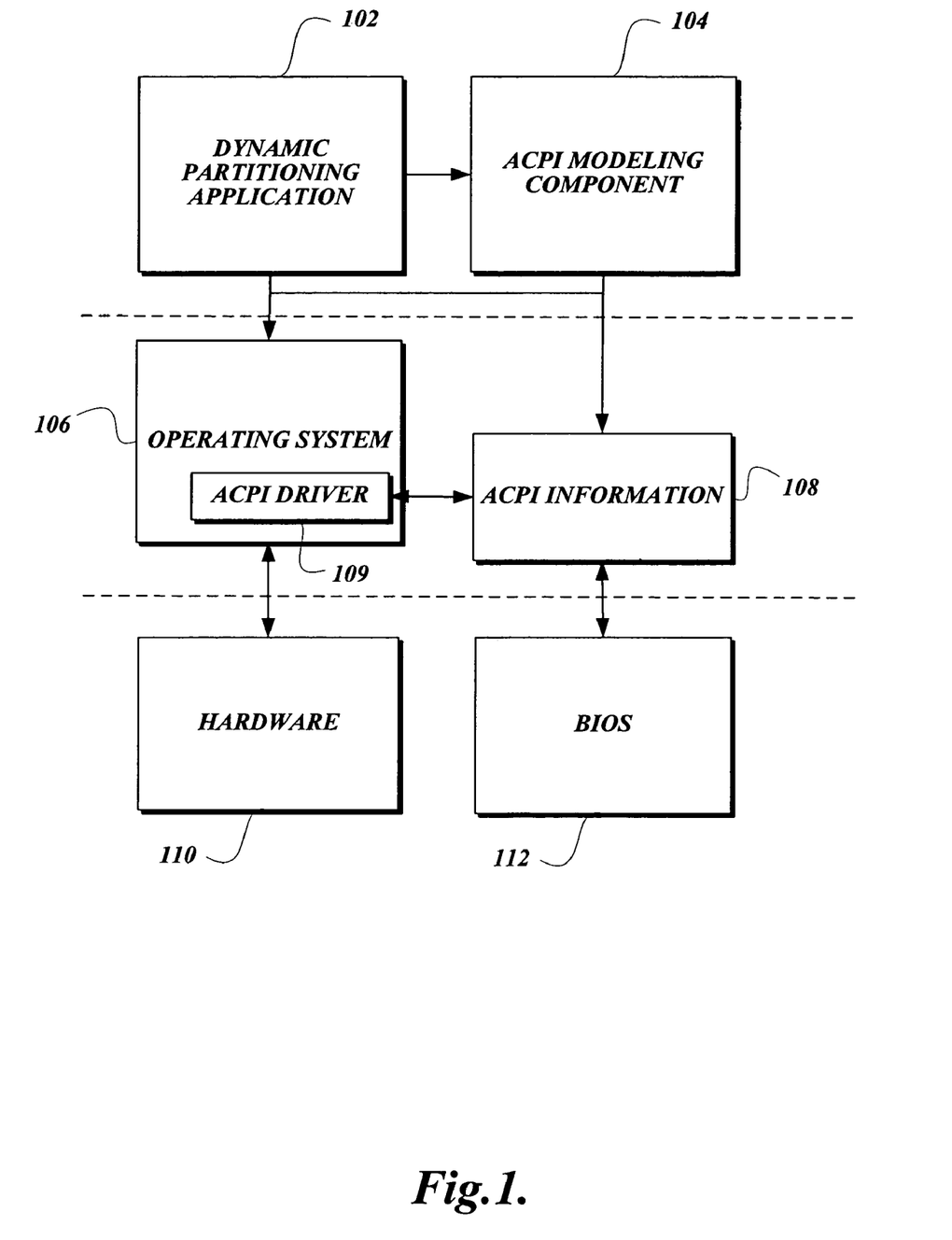
FIG. 1 is a block diagram illustrative of a system for implementing dynamic partitioning in accordance with an embodiment of the present invention.

FIG. 1 is a block diagram illustrative of various components associated with a computer system 100 for implementing hardware dynamic partitioning in accordance with an aspect of the present invention. As will be described in greater detail below, the computer system 100 includes an operating system 106, hardware 110, and BIOS 112. A driver module, such as ACPI driver 109, is loaded during computer system start-up. The ACPI driver 109 acts as an interface between the operating system 106 and the BIOS 112. As shown in FIG. 1, the ACPI driver 109 may be supplied as part of the operating system 106. Alternatively, the ACPI driver 109 may be supplied as a separate component from the operating system 106. Typically, the ACPI driver 109 is responsible to support plug and play, and power management. Further, the ACPI driver 109 is responsible for initiating and maintaining the hardware 110, such as by populating ACPI namespace information at system boot time, loading and unloading description blocks from the ACPI namespace information, handling certain events triggered by hardware components, and the like. However, it is to be noted that the ACPI driver 109 is used only as an example. Any suitable driver modules can be included for initiating and maintaining hardware components by loading and unloading the namespace information corresponding to the hardware components.

The computer system 100 further includes a DP application 102 for obtaining a hardware topology of a computer system and an ACPI modeling component 104 for translating the obtained hardware topology of the computer system into ACPI namespace information 108. As will be explained in greater detail, the operating system 106 can dynamically change the contents of the namespace at run-time by loading and/or unloading definition blocks from the ACPI tables that reside in the BIOS 112. The ACPI namespace information 108 corresponds to the Differentiated System Description Table (DSDT) that contains the Differentiated Definition Block, and one or more other definition blocks. The ACPI namespace information 108 also contains hierarchical data such as module device objects that is used to group physical hardware device in a container object.

The ACPI namespace information 108 may be stored in such a way that the operating system 106 can easily upload components of the ACPI namespace information. In one embodiment, the ACPI namespace information 108 may be added to Registry of the computer system. One of ordinary skill in the art would appreciate that the Registry is used to store information necessary to configure the computer system for several users, applications, and hardware devices. In another embodiment, the ACPI namespace information 108 may be stored in a database residing on OS-controlled memory.

Figure 2:
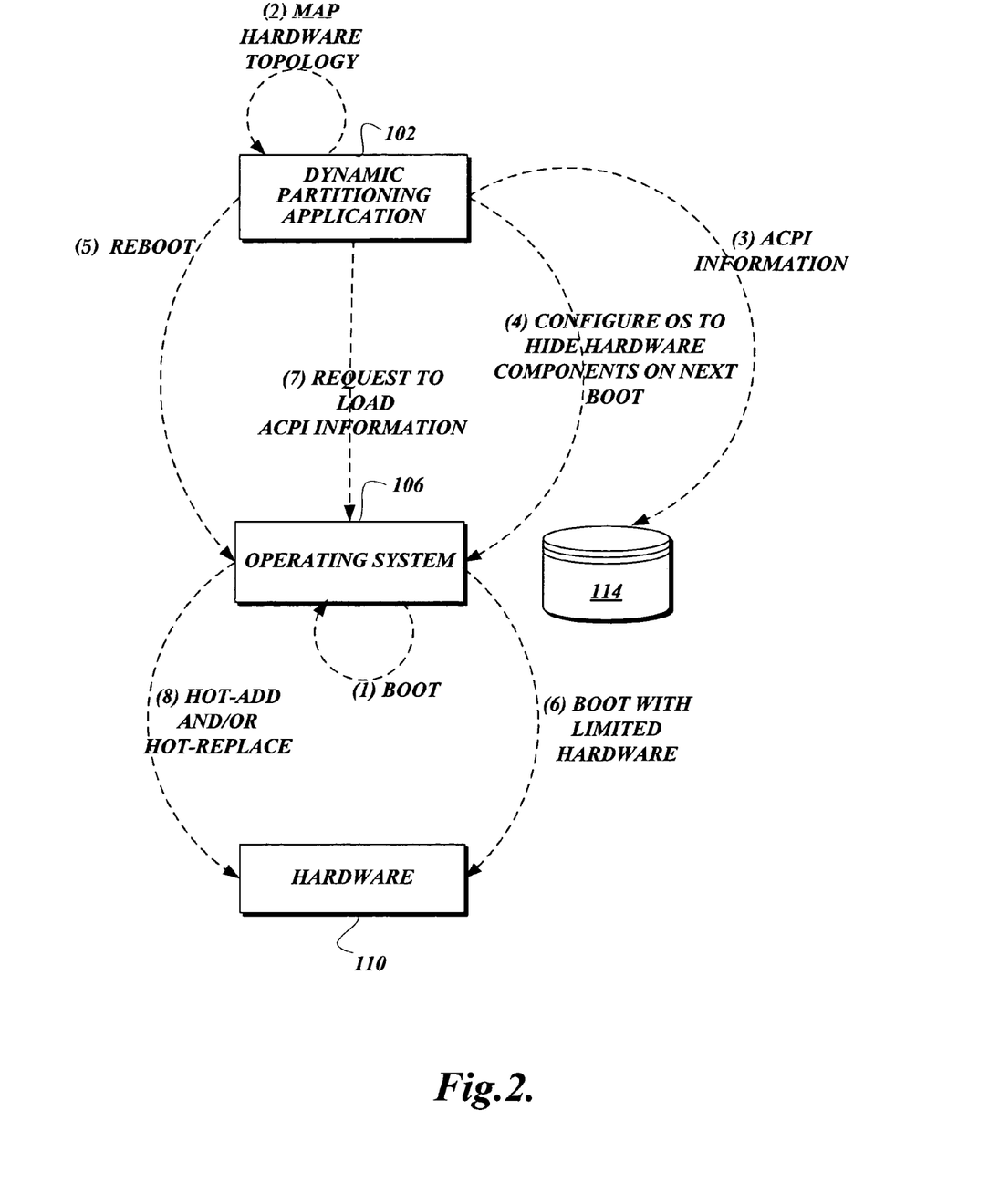
FIG. 2 is a block diagram of the system of FIG. 1 illustrating interactions among software and hardware components of the system for implementing dynamic partitioning.

With reference to FIG. 2, a block diagram illustrating interactions among software, and hardware components of the computer system 100 for implementing dynamic partitioning capabilities is shown. The operating system 106 boots up the computer system 100 with hardware 110 currently present in the system. The DP application 102 maps the hardware topology of the computer system 100 by discovering hardware information such as physical attributes of the hardware components, physical address range, and the like. In one embodiment, the DP application 102 may retrieve a Multiple Advanced Programmable Interrupt Controller (APIC) Description Table (MADT) which has been created during system start-up. Generally, the MADT is used on systems supporting APIC and Streamlined Advanced Programmable Interrupt Controller (SAPIC) to describe the APIC implementation. The DP application 102 causes the hardware topology to be translated into ACPI namespace information 108. The translated ACPI namespace information 108 includes corresponding namespace information (e.g., a corresponding description block, a module object, and the like) of the hardware components that are desired to be hot-added or hot-replaced. The translated ACPI namespace information 108 is stored in a database 114.

The DP application 102 configures boot information to cause the hardware to be inactive (hidden) on next boot. In one embodiment, the boot information includes a boot switch (or a boot option) that is configured to select which hardware components to boot at the time of start-up. For example, a boot switch may be configured to boot with a minimal number of hardware components. Thus, the DP application 102 utilizes the boot information to configure only certain hardware components to be inactive and remaining hardware to be active on next boot. However, it is to be appreciated that the boot information described here is not related to a specific type of operating system. Rather, any suitable boot information can be used as boot options as long as it can be configured to select desired devices to boot when the computer system 100 is starting up.

After having the ACPI namespace information 108 of the hardware topology stored in the database 114, the DP application 102 causes the operating system 106 to reboot the computer system with limited hardware components indicated in the configured boot information. As such, the operating system 106 reboots the computer system 100 with the hardware component hidden (inactive) and the remaining hardware component retained (active). The hidden hardware may be present in the computer system 100, but the hardware has not yet been recognized by the operating system.

After the reboot, the DP application 102 causes the operating system 106 to dynamically load various components stored in the ACPI namespace information 108. As described above, the ACPI namespace information 108 is evaluated by the ACPI driver 109 upon loading. As the ACPI namespace information 108 is being evaluated, the hidden hardware component is initiated and eventually recognized by the operating system 106. In this manner, the hardware components can be recognized as hot-add and/or hot-replace in the computer system 100.

It is to be noted that various hardware components may be recognized as hot-add and hot-replace. Examples of the hardware components include, but are not limited to, processors, memory, I/O devices, and the like. In some instances, a user may desire to test processor hot-add on a computer system, or a user may desire to test both processor hot-replace and memory hot-add on a computer system. For example, a computer system may include four processors and a user desires to test hot-add of three processors on a system with one processor running. After obtaining the hardware topology of the system, the DP application, in conjunction with the ACPI modeling component, creates the ACPI namespace information for four processors and other hardware components. The boot loader options are configured to hide three processors on next boot time. After the reboot, the user will find a computer system with one processor active and three processors inactive. The ACPI namespace information is loaded to cause an ACPI driver in the operating system to evaluate the ACPI namespace information. This will turn the kernel and Hardware Abstraction Layer (HAL) in the operating system to add new processors (i.e., three hidden processors) to the available resource pool of the computer system.

Figure 3A:
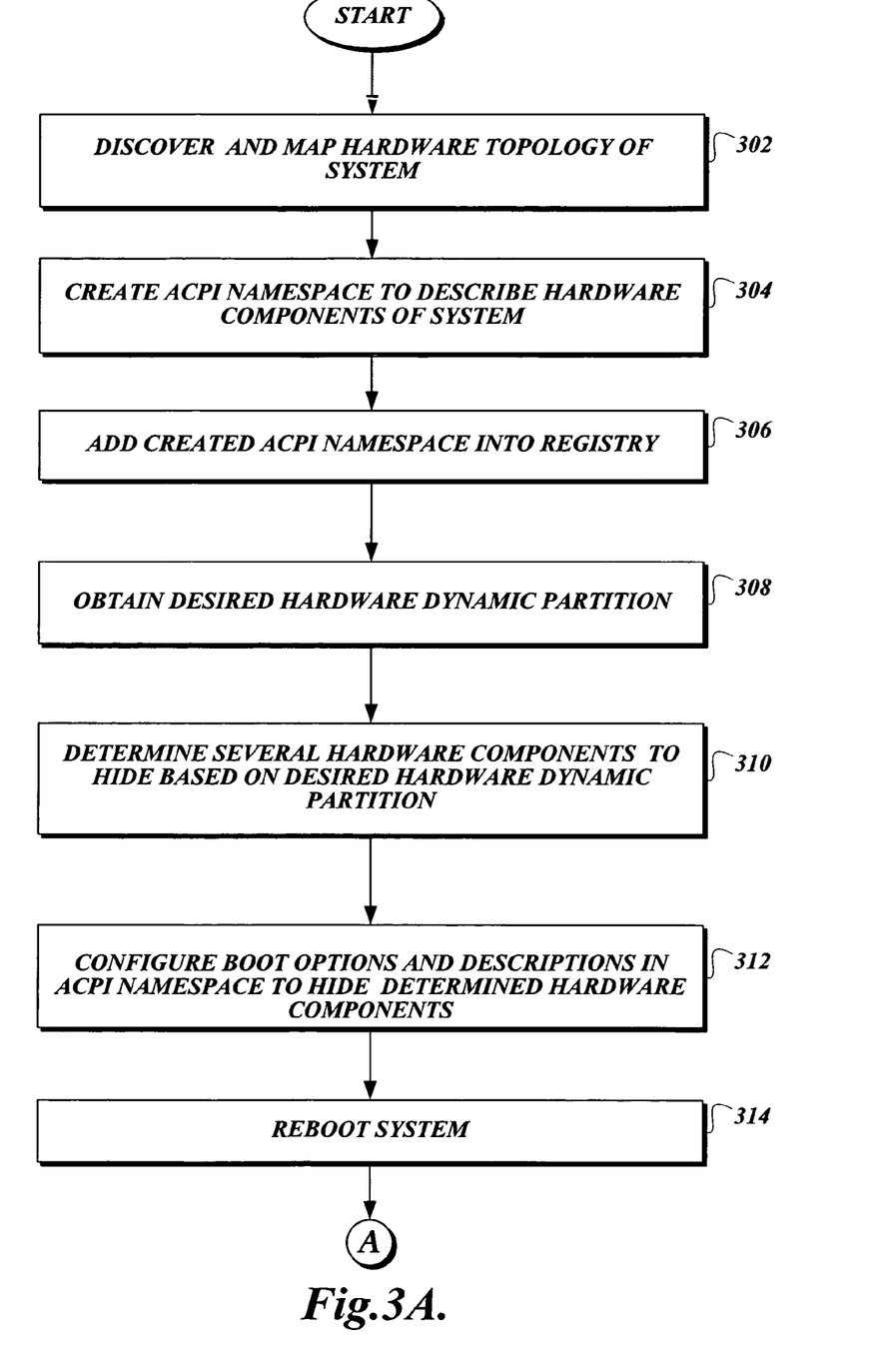
FIGS. 3A and 3B are flow diagrams of dynamic partitioning routine in accordance with an embodiment of the present invention.
Figure 3B:
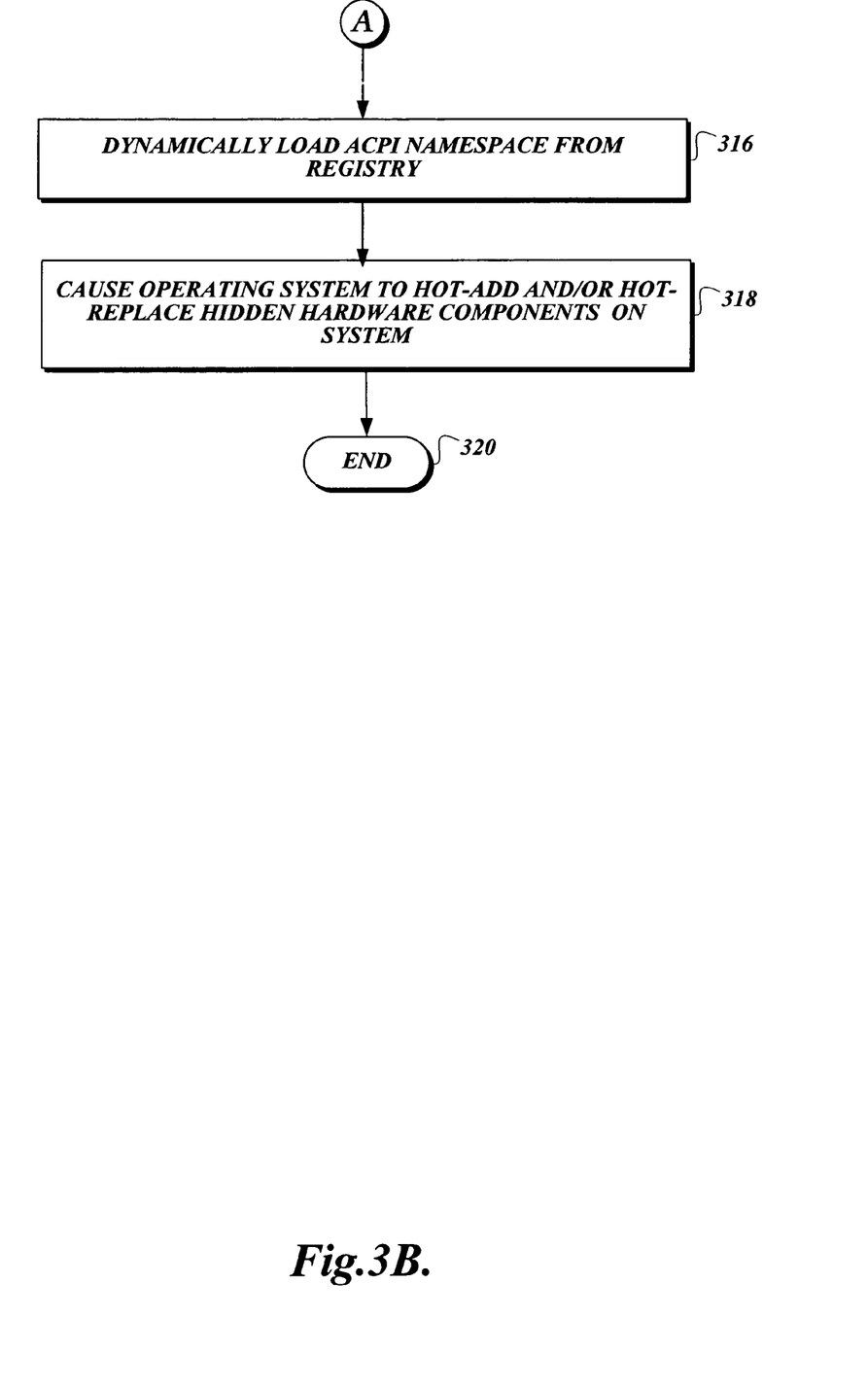

With reference to FIGS. 3A and 3B, flow diagrams of hardware dynamic partitioning routine 300 in accordance with an aspect of the present invention are shown. Beginning at block 302, the DP application 102 discovers and maps the hardware topology of the computer system 100 which has been already started. ACPI namespace information 108 is created to describe various hardware components of the computer system 100 at block 304. After having the ACPI namespace information 108 created, the DP application 102 adds the created ACPI namespace information 108 into Registry at block 306. Alternatively, the DP application 102 stores the created ACPI namespace information 108 in a database 114 suitable for being easily uploaded by the operating system 106.

At block 308, the DP application 102 obtains a desired dynamic hardware partition. For example, a user may provide a selection of specified hardware partitioning configuration. The desired dynamic hardware partition may include hot-add processor, hot-add memory, hot-replace processor, and hot-replace memory, each of which will be described in greater detail below. At block 310, based on the desired dynamic hardware partition, the DP application 102 determines several hardware components which are to be hidden (inactive) on next boot. Boot information and description blocks in the ACPI namespace information 108 are configured to hide the determined hardware components at block 312. As described above, the DP application 102 may configure the boot information such as a boot switch. The DP application 102 causes the operating system 106 to reboot the computer system 100 with limited hardware components as indicated in the configured boot information at block 314.

Turning to FIG. 3B, at block 316, the DP application 102 causes the operating system 106 to load the ACPI namespace information 108 from the Registry. It is to be noted that there are various ways to cause the operating system 106 to load the ACPI namespace information 108. In a particular embodiment, the DP application 102 requests to execute LoadTable( ) operator, one of ACPI Source Language (ASL) operators, to load the ACPI namespace information 108 during the reboot. As the ACPI namespace information 108 is loaded, ACPI namespace information 108 is evaluated to cause the operating system 106 to hot-add and hot-replace hidden hardware components on the computer system 100 at block 318. Consequently, the hidden hardware components are recognized by the operating system 106. The hardware dynamic partitioning routine 300 terminates at block 320.

Figure 4:
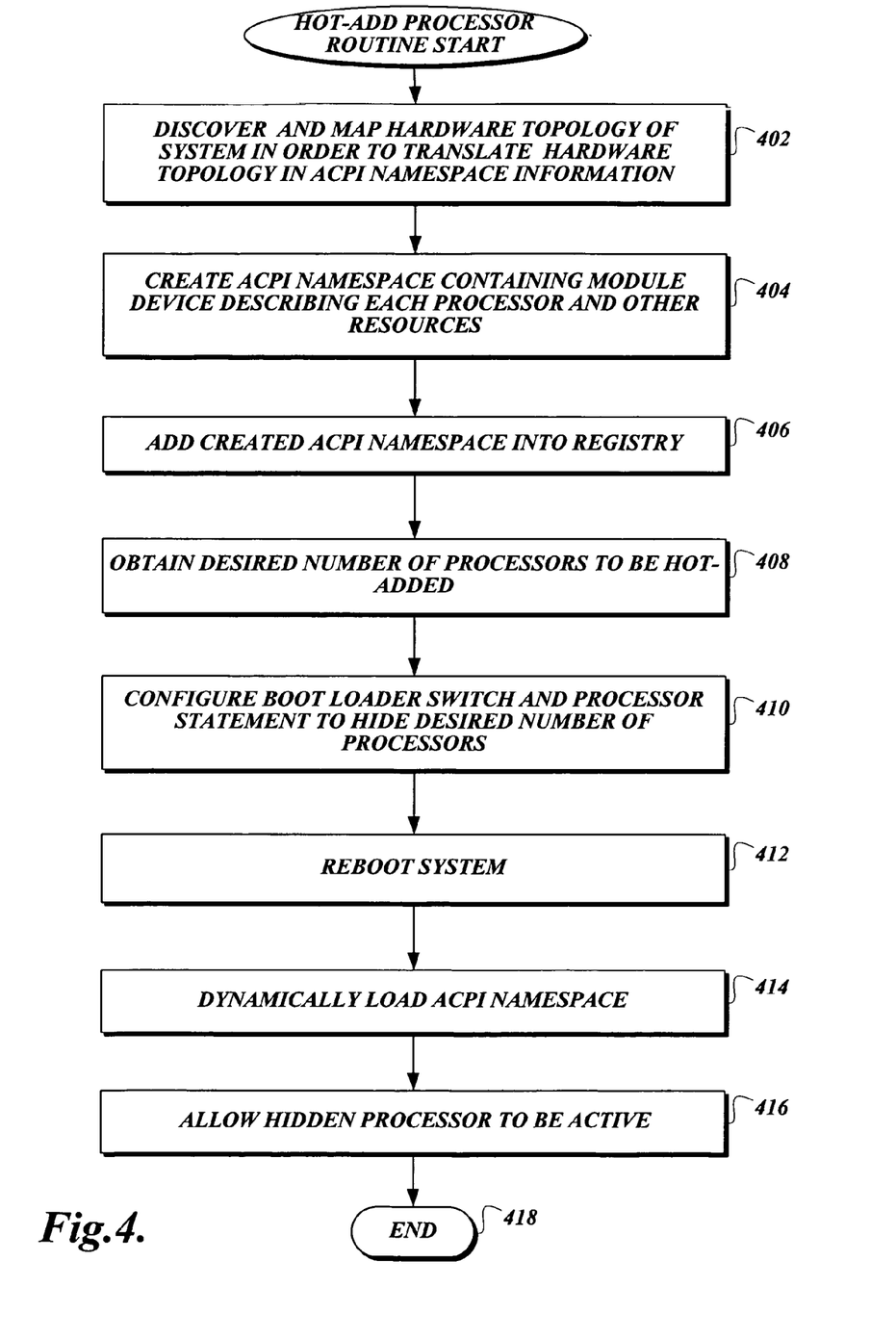
FIG. 4 is a flow diagram of hot-add processor routine for utilizing hardware dynamic partitioning in accordance with an embodiment of the present invention.

FIG. 4 is a flow diagram of a hot-add processor routine 400 for utilizing hardware dynamic partitioning in accordance with an embodiment of the present invention. Beginning at block 402, the DP application 102 discovers and maps the hardware topology of the computer system 100 in order to translate the hardware topology in ACPI namespace information 108. The ACPI namespace information 108 is created containing a module device describing each processor and other resources at block 404. After having the ACPI namespace information 108 created, the DP application 102 adds the created ACPI namespace information 108 into Registry. Alternatively, the DP application 102 stores the created ACPI namespace information 108 in a database 114 suitable for being uploaded by the operating system 106. At block 408, the DP application 102 obtains a desired number of processors to be hot-added. The hot-add processor routine 400 proceeds to block 410 where the DP application 102 configures a boot loader switch and a processor statement to hide a desired number of processors from the operating system 106 on next boot. Alternatively, the DP application 102 can configure the computer system 100 to boot with a minimal number of processors. At block 412 the DP application 102 causes the operating system 106 to reboot the computer system 100 with the configured boot information. After having the computer system 100 rebooted, the hot-add processor routine 400 proceeds to block 414 where the DP application 102 causes the operating system 106 to load the ACPI namespace information 108 from the Registry. As the ACPI namespace information 108 is loaded, the ACPI namespace information 108 is evaluated to cause the operating system 106 to add the hidden processor to be active on the computer system 100 at 416. The processor is added to the available resource pool of the computer system and recognized as available by the operating system 106. The hot-add processor routine 400 terminates at block 418.

Figure 5A:
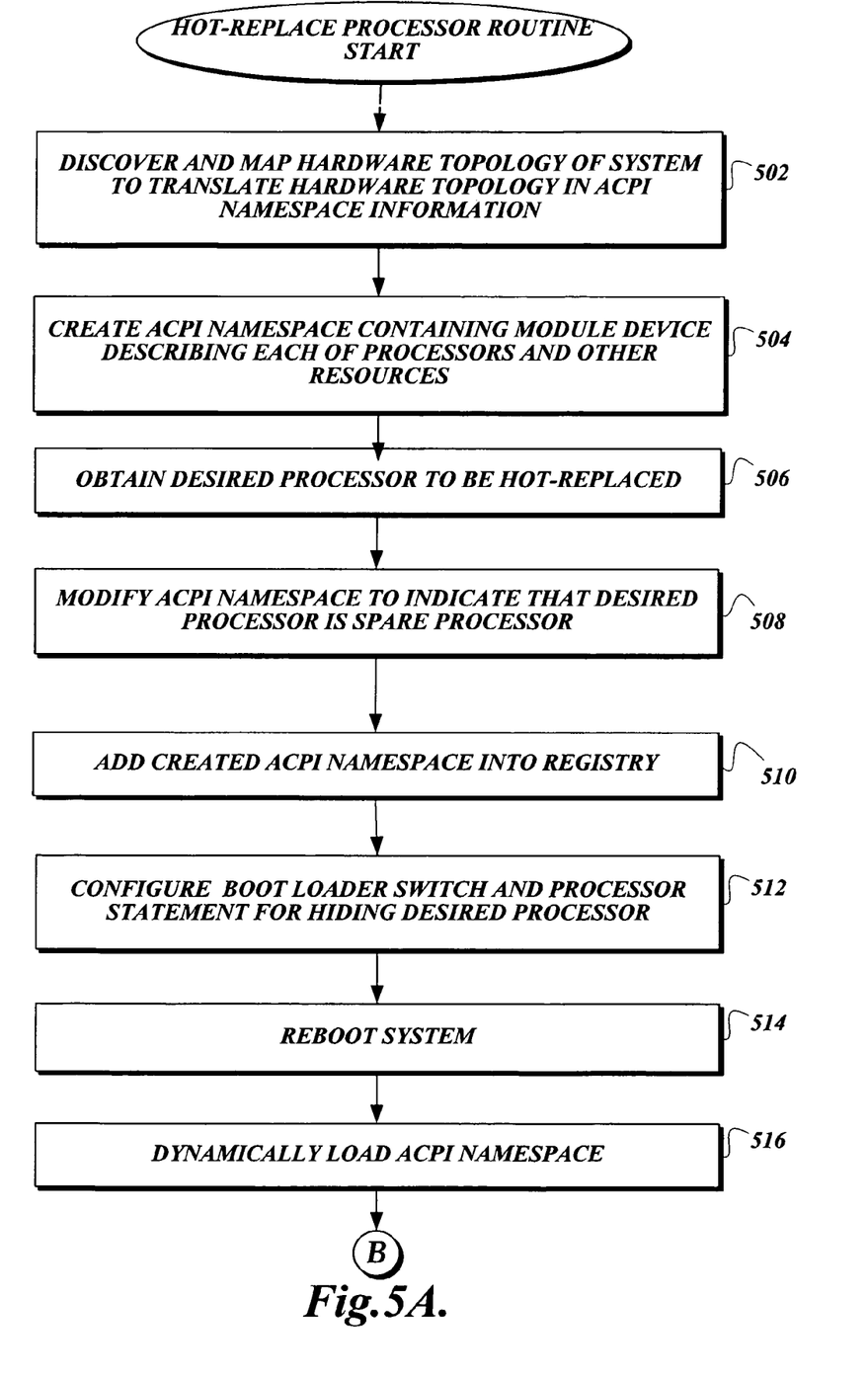
FIGS. 5A and 5B are flow diagrams of a hot-replaced processor routine for utilizing hardware dynamic partitioning in accordance with an embodiment of the present invention.
Figure 5B:
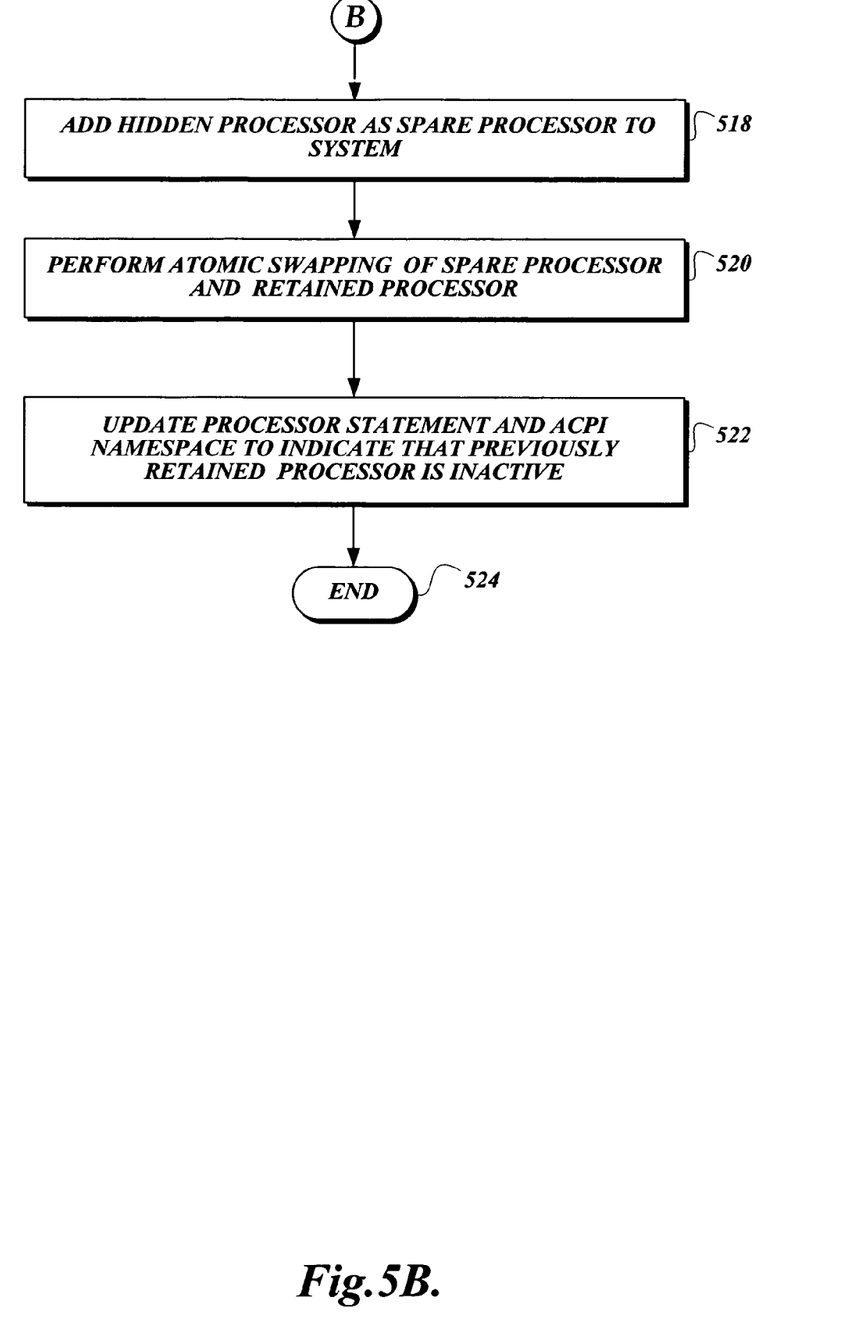

With reference now to FIGS. 5A and 5B, flow diagrams of a hot-replaced processor routine 500 for utilizing hardware dynamic partitioning in accordance with an embodiment of the present invention are shown. Beginning at block 502, the DP application 102 discovers and maps the hardware topology of the computer system 100 in order to translate the hardware topology in ACPI namespace information 108. The ACPI namespace information 108 containing a module device describing each processor and other resources is created at block 504. At block 506, the DP application 102 obtains a desired processor to be hot-replaced. The hot-replaced processor routine 500 proceeds to block 508 where the DP application 102 modifies the ACPI namespace information corresponding to the desired processor to indicate that the desired processor is added as a spare processor. In this manner, the desired processor will be recognized as a spare by the operating system 106 as the ACPI namespace information 108 is evaluated at the system boot time. At block 510, the DP application 102 adds the created ACPI namespace information 108 into Registry. Alternatively, the DP application 102 stores the created ACPI namespace information 108 in a database which is suitable for being uploaded by the operating system 106 in response to a load request from the DP application 102. After having the ACPI namespace information 108 stored, the DP application 102 configures a boot loader switch and a processor statement to hide the desired processors from the operating system 106 on next boot at block 512. At block 514, the DP application 102 causes the operating system 106 to reboot the computer system 100 with the configured boot loader switch. After having the computer system 100 rebooted, the DP application 102 causes the operating system 106 to dynamically load the ACPI namespace information 108 from the Registry at block 516.

Turning to FIG. 5B, at block 518, the operating system 106 is caused to add the hidden processor as a spare processor on the computer system 100 as the ACPI namespace information 108 corresponding to the desired processor is evaluated. It will be appreciated by one of ordinary skill in the art that the spare processor is recognized as available by the operating system 106. At block 520, the DP application 102 causes the operating system 106 to perform atomic swapping of the spare processor and one of the processors which were retained at the reboot time. As a result of the atomic swap, the processor statement and the ACPI namespace information 108 are updated to indicate that the swapped processor is inactive at block 522. The hot-replaced processor routine 500 terminates at block 524

Figure 6:
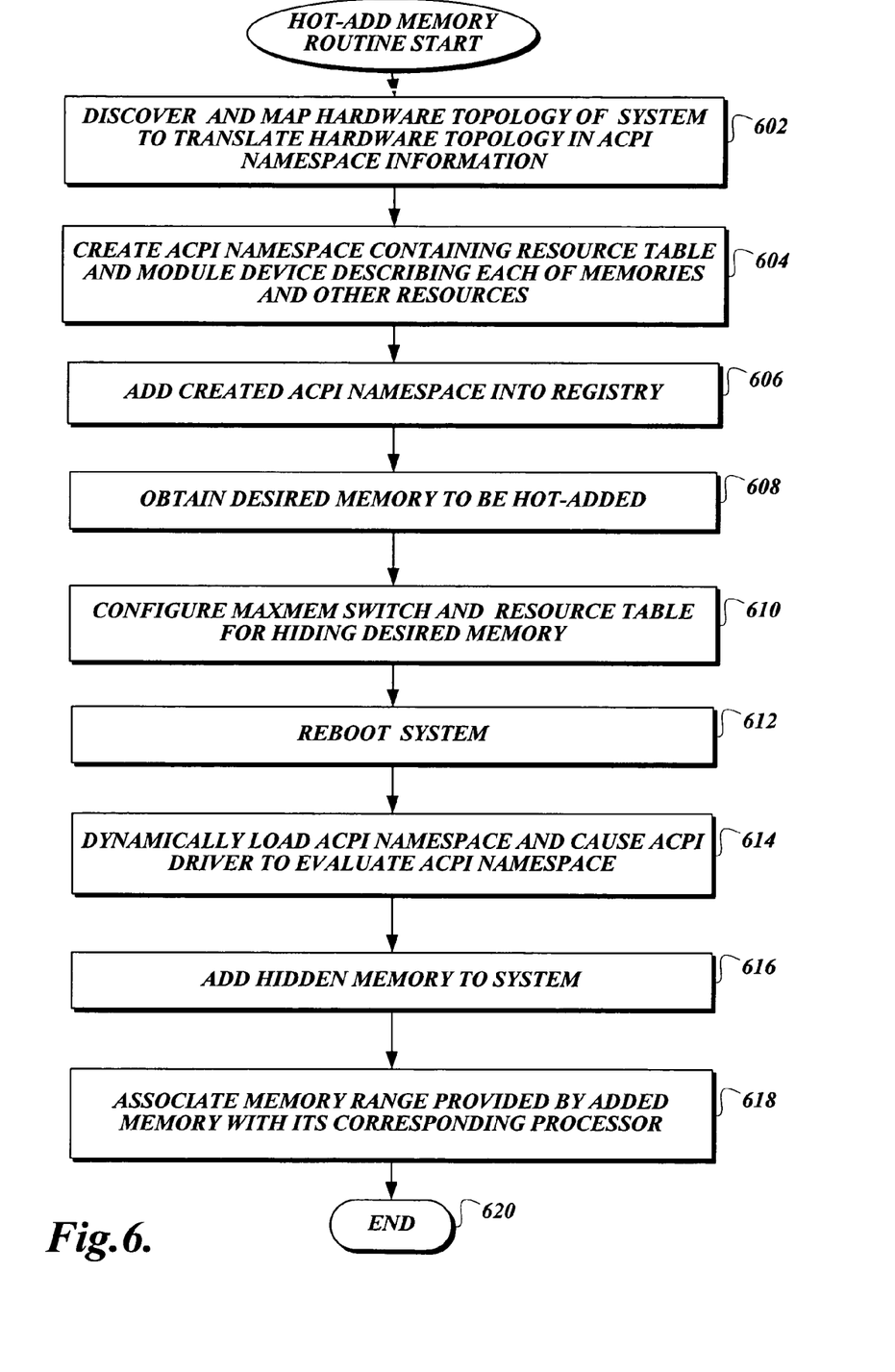
FIG. 6 is a flow diagram of a hot-add memory routine for utilizing hardware dynamic partitioning in accordance with an embodiment of the present invention.

With reference to FIG. 6, a flow diagram of a hot-add memory routine 600 for utilizing hardware dynamic partitioning in accordance with an embodiment of the present invention is shown. Beginning at block 602, the DP application 102 discovers and maps the hardware topology of the computer system 100 to translate the hardware topology into ACPI namespace information 108. The DP application 102, in conjunction with the ACPI modeling component 104, creates the ACPI namespace information 108 of the hardware topology. The ACPI namespace information 108 is created containing namespace information such as a resource table and a module device describing each memory and other resources, among others at block 604. An example of the resource table includes System Resource Affirmative Table (SRAT). Generally, SRAT provides information that allows the operating system 106 to associate processors and memory ranges, including ranges of memory provided by hot-added memory devices, with system localities/proximity domains.

After having the ACPI namespace information 108 created, the DP application 102 adds the created ACPI namespace information 108 into Registry at block 606. Alternatively, the DP application 102 stores the created ACPI namespace information 108 in a database 114 suitable for being uploaded by the operating system 106. At block 608, The DP application 102 obtains desired memory to be hot-added. The hot-add memory routine 600 proceeds to block 610 where the DP application 102 configures a boot option switch for memory and a resource table to hide desired memory from the operating system 106. In a particular embodiment, "maxmem" boot switch may be configured. It will be appreciated that the "maxmem" boot switch is utilized by a certain operating system to specify the maximum range of memory in the system. However, any suitable boot option switches for specifying maximum range of memory may be configured at block 610. For example, in an exemplary embodiment, a system may include one 4 gigabyte RAM. A user may desire to test 1 gigabyte RAM to be hot-added. The "maxmem" boot switch may be configured to indicate that 3 gigabytes of RAM will be available for the computer system on next boot. In such a scenario, the 3 gigabyte portion of RAM becomes available, but the 1 gigabyte portion of RAM is hidden from the operating system after the reboot.

At block 612, the DP application 102 causes the operating system 106 to reboot the computer system 100 with a limited range of memory being active. After having the computer system 100 rebooted, the hot-add memory routine 600 proceeds to block 614 where the DP application 102 causes the operating system 106 to load the ACPI namespace information 108 from the Registry. As the ACPI namespace information 108 is loaded, ACPI namespace information 108 is evaluated by the ACPI driver 109. At block 616, the hidden memory is added to be available to the computer system 100. The operating system 106 associates a memory range provided by the added memory with its corresponding processor based on the resource table at block 618. The hot-add memory routine 600 terminates at block 620.

Figure 7A:
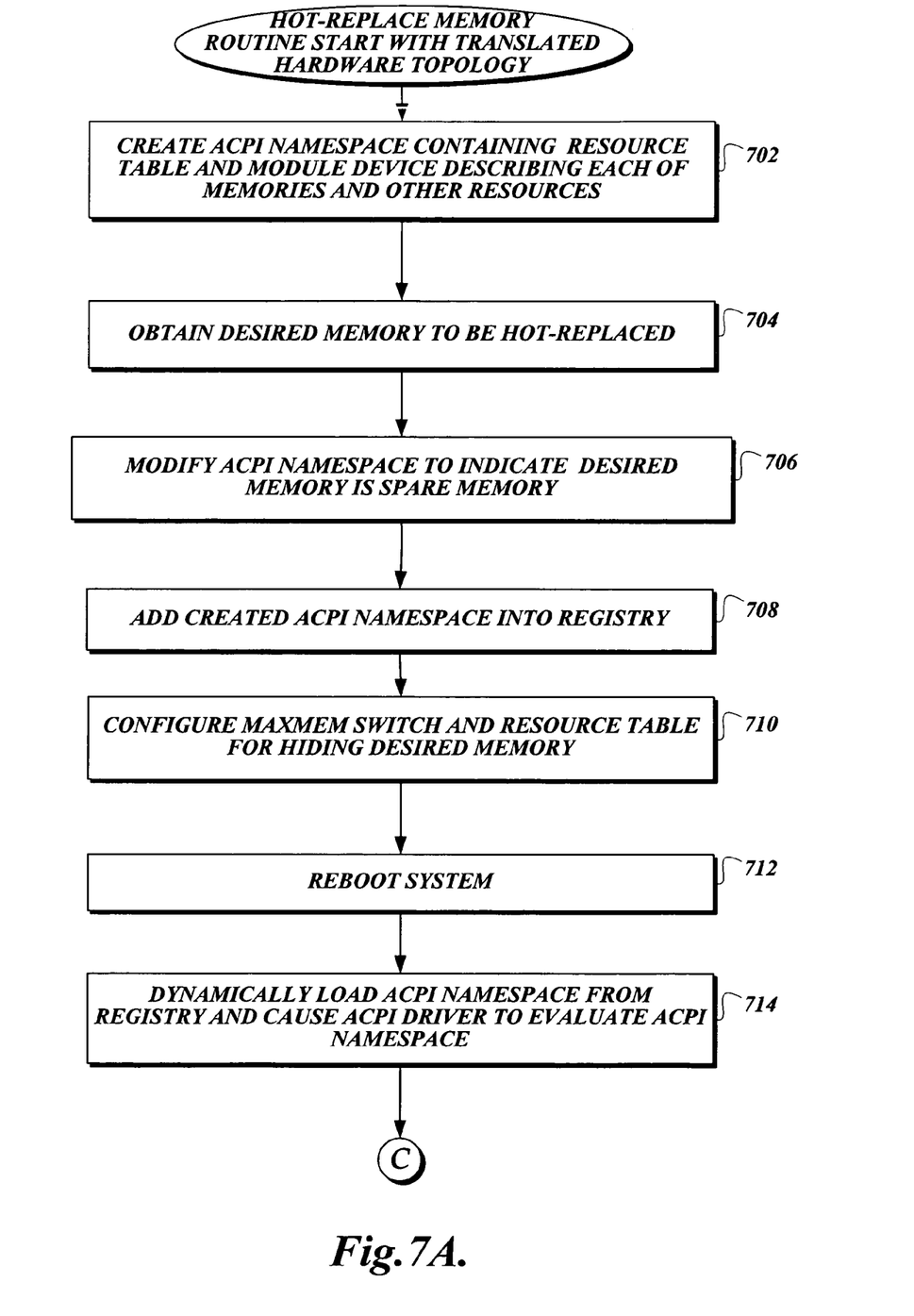
FIGS. 7A and 7B are flow diagrams of a hot-replace memory routine for utilizing hardware dynamic partitioning in accordance with an embodiment of the present invention.
Figure 7B:
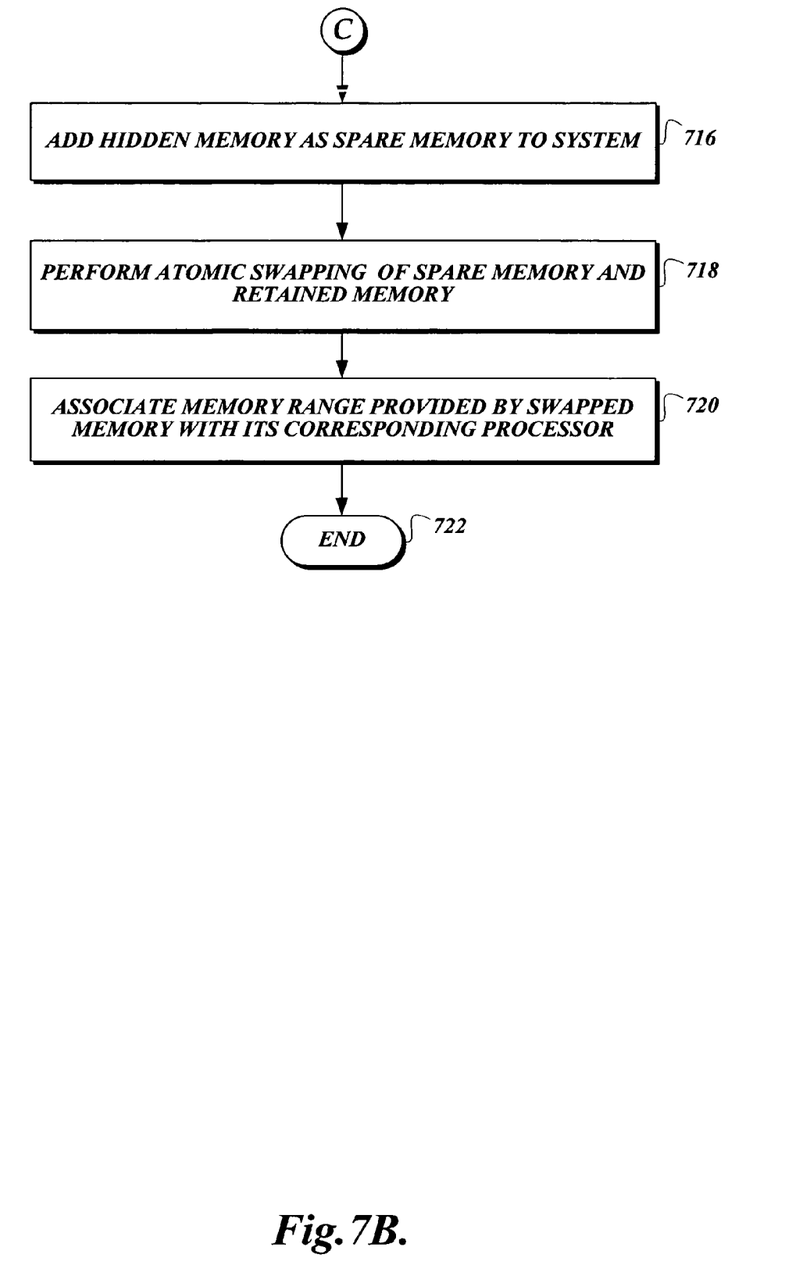

With reference to FIGS. 7A and 7B, flow diagrams of a hot-replace memory routine 700 for utilizing hardware dynamic partitioning in accordance with an embodiment of the present invention is shown. The hot-replace memory routine 700 starts with the translated hardware topology in the ACPI namespace information 108. Beginning at block 702, the DP application 102, in conjunction with the ACPI modeling component 104, creates the ACPI namespace information 108. The ACPI namespace information 108 is created containing namespace information such as a resource table and a module device describing each memory and other resources, among others. As discussed above, the resource table can be any suitable resource table allowing the operating system 106 to associate processors and memory ranges. The suitable resource table includes ranges of memory provided by hot-added memory devices and system localities/proximity domains. The suitable resource table is evaluated only during the operating system initialization, such as during system boot. The DP application 102 obtains desired memory to be hot-replaced at block 704. The hot-replace memory routine 700 proceeds to block 706 where the DP application 102 modifies the ACPI namespace information corresponding to the desired memory to indicate that the desired memory is spare memory on next boot. Example of the corresponding ACPI namespace information includes a corresponding definition block, and the like.

In this manner, the desired memory will be recognized to be available as spare memory by the operating system 106 as the ACPI namespace information 108 is loaded. At block 708, the DP application 102 adds the created ACPI namespace into Registry. After having the ACPI namespace information 108 stored, the DP application 102 configures a boot option for memory such as "maxmem" switch and a resource table to hide the desired memory from operating system 106 on next boot at block 710. Alternatively, the DP application 102 can configure the computer system 100 to boot with a minimal range of memory. At block 712, the DP application 102 causes the operating system 106 to reboot the computer system 100 with limited memory based on the configured boot options. After having the computer system 100 rebooted, the DP application 102 causes the operating system 106 to dynamically load the ACPI namespace information 108 from the Registry. As the ACPI namespace information 108 is being loaded, the ACPI driver 109 is caused to evaluate objects in the loaded ACPI namespace information 108 at block 714.

Turning to FIG. 7B, at block 716, the operating system 106 is caused to add the hidden memory as spare memory on the computer system 100 as the ACPI namespace information 108 corresponding to the desired memory is evaluated. The DP application 102 causes the operating system 106 to perform atomic swapping of the spare memory and a portion of memory which was retained at the reboot time at block 718. As a result of the atomic swap, the resource table and the ACPI namespace information 108 are updated to indicate that the swapped memory is not available. The operating system 106 associates the memory range provided by the spare memory with its corresponding processor based on the resource table at block 720. The hot-replace memory routine 700 terminates at block 722.

While illustrative embodiments have been illustrated and described, it will be appreciated that various changes can be made therein without departing from the spirit and scope of the invention.

The embodiments of the invention in which an exclusive property or privilege is claimed are defined as follows:

1. A method for managing hardware on a computer system, the method comprising:
obtaining a hardware topology of the computer system, the hardware topology including information on active hardware components of computer system;
translating the hardware topology of the computer system into namespace information, wherein the namespace information describes the active hardware components;
storing the namespace information to memory;
configuring boot information in the namespace information to hide at least one hardware component from the active hardware components on a next boot and to cause remaining hardware components of the active hardware components to remain active on the next boot, the at least one hardware component being selected from a group including a processor;

rebooting the computer system with the at least one hardware component being hidden and the remaining hardware components remaining active according to the configured boot switch information; and after the reboot, dynamically loading the namespace information from the memory, wherein the namespace information includes namespace information corresponding to the at least one hardware component being hidden, and evaluating the namespace information corresponding to the at least one hardware component being hidden to cause the operating system to recognize the at least one hardware component.

2. The method as recited in claim 1 further comprising: determining a configuration for causing the at least one hardware component to be recognized after the reboot.

3. The method as recited in claim 2 further comprising: if hot-adding the at least one hardware component is desired, adding the at least one hardware component to the computer system as the loaded namespace information on the at least one hardware component is evaluated, wherein the added hardware component becomes available to the computer system.

4. The method as recited in claim 2 further comprising: if hot-replacing another hardware component of the hardware components with the at least one hardware component is desired:

modifying the namespace information to indicate the at least one hardware component as a spare hardware component, and after the reboot, causing the operating system to recognize the at least one hardware component as the spare hardware component.

5. The method as recited in claim 1, wherein the at least one hardware component comprises at least one of a processor, memory, and an input/output device.

6. A computer-readable medium having computer-executable components for implementing dynamic partitioning, the components comprising:

a dynamic partition component for obtaining a hardware topology of a computer system, the hardware topology including information on active hardware components of the computer system;

a namespace translator component for translating the obtained hardware topology of the computer system in namespace information, the namespace information including namespace information corresponding to at least one hardware component from the active hardware components; and a data storage component for storing the namespace information;

wherein the dynamic partition component:

configures boot switch information to cause the at least one hardware component to be hidden and remaining hardware components to remain active on next boot, the hardware component caused to be hidden being selected from a group including a processor;

causes an operating system to reboot the computer system with the at least one hardware component being hidden and the remaining hardware components remaining active according to the configured boot switch information, to load the namespace information corresponding to the at least one hardware component, and to recognize the at least one hardware component as the loaded namespace information is evaluated.

7. The computer-readable medium recited in claim 6, wherein if the at least one hardware component is a processor to be hot-added, the dynamic partition component causes the operating system to add the processor to the computer system when the operating system recognizes the at least one hardware component.

8. The computer-readable medium recited in claim 6, wherein if the at least one hardware component is a first processor to be hot-replaced with a second processor, the dynamic partition component causes the operating system to swap the first processor with the second processor when the operating system recognizes the at least one hardware component.

9. The computer-readable medium recited in claim 8, wherein the dynamic partition component causes the operating system to add the first processor as a spare processor before the swap is performed.

10. The computer-readable medium recited in claim 6, wherein if the at least one hardware component is memory to be hot-added, the dynamic partition component causes the operating system to add the memory to the computer system when recognizing the at least one hardware component and to associate a memory range provided by the added memory with its corresponding processor.

11. The computer-readable medium recited in claim 6, wherein if the at least one hardware component is first memory to be hot-replaced with second memory, the dynamic partition component causes the operating system to swap the first memory with the second memory when the operating system recognizes the at least one hardware component.

12. The computer-readable medium recited in claim 11, wherein the dynamic partition component causes the operating system to add the first memory as spare memory before the swap is performed.

13. A computer-readable medium having computer-executable components for implementing a method for performing a hardware dynamic partition, the method comprising:

obtaining a hardware topology of a computer system, the hardware topology including information on hardware components of the computer system, the hardware components including a processor;

obtaining an advanced configuration power interface (ACPI) namespace information corresponding to the hardware topology, the ACPI namespace information being stored to memory;

simulating a dynamic hardware partition of the computer system by configuring boot switch information to cause the first hardware component of the hardware components to be hidden on a next boot and at least one second hardware component of the hardware components to remain active on next boot, the first hardware component being selected from a group including a processor;

rebooting the computer system without recognizing the first hardware component but with recognizing the at least one second hardware component according to the configured boot switch information; and after the computer system has been rebooted, dynamically loading the ACPI namespace information, including namespace information corresponding to the first hardware component, from the memory.

14. The method as recited in claim 13 further comprising: configuring a boot switch to cause the first hardware component to be hidden.

15. The method as recited in claim 13 further comprising adding the first hardware component to be available to the computer system if a hardware dynamic partition indicates to hot-add the first hardware component.

16. The method as recited in claim 13 further comprising: swapping the first hardware component with the second hardware component if the hardware dynamic partition indicates to hot-replace those hardware components.

17. The method as recited in claim 15 further comprising when the hot-added first hardware component is memory, associating a memory range provided by the memory with its corresponding processor.

18. The method as recited in claim 1, wherein simulating a dynamic hardware partition of the computer system comprises hot-adding or hot-replacing of the first hardware component.

19. The method as recited in claim 4, further comprising:
adding the at least one hardware component as the spare hardware component on the computer system; and
swapping the spare hardware component with the another hardware component.

20. The method as recited in claim 13, wherein configuring the boot switch information comprises simulating a dynamic hardware partition of the computer system.

* * * * *

UNITED STATES PATENT AND TRADEMARK OFFICE
CERTIFICATE OF CORRECTION

PATENT NO. : 7,757,030 B2  
APPLICATION NO. : 11/305049  
DATED : July 13, 2010  
INVENTOR(S) : Bruce J. Sherwin, Jr. et al.

Page 1 of 1

It is certified that error appears in the above-identified patent and that said Letters Patent is hereby corrected as shown below:

In Sheet 1 of 10, (Fig. 1.), line 1, above "104" insert -- ⌒100 --.

In Sheet 2 of 10, (Fig. 2.), line 1, above "102" insert -- ⌒100 --.

In Sheet 3 of 10, (Fig. 3A.), line 1, above "302" insert -- ⌒300 --.

In Sheet 4 of 10, (Fig. 3B.), line 1, above "316" insert -- ⌒300 --.

In Sheet 5 of 10, (Fig. 4.), line 1, above "402" insert -- ⌒400 --.

In Sheet 6 of 10, (Fig. 5A.), line 1, above "502" insert -- ⌒500 --.

In Sheet 7 of 10, (Fig. 5B.), line 1, above "518" insert -- ⌒500 --.

In Sheet 8 of 10, (Fig. 6.), line 1, above "602" insert -- ⌒600 --.

In Sheet 9 of 10, (Fig. 7A.), line 1, above "702" insert -- ⌒700 --.

In Sheet 10 of 10, (Fig. 7B.), line 1, above "716" insert -- ⌒700 --.

Signed and Sealed this  
Eighth Day of February, 2011

David J. Kappos  
*Director of the United States Patent and Trademark Office*